(12) United States Patent
Moy et al.

(10) Patent No.: US 8,115,649 B2
(45) Date of Patent: Feb. 14, 2012

(54) SLAT SKEW DETECTION SYSTEM

(75) Inventors: George Moy, Seattle, WA (US); Peter Angel Padilla, Mill Creek, WA (US); Michael Edward Renzelmann, Woodinville, WA (US); Mark J. Gardner, Snohomish, WA (US); Charles E. Jokisch, Lynnwood, WA (US); William Suhail Hanna, Bellevue, WA (US); Eric J. Selby, Lake Stevens, WA (US); Mark A. Barr, Seattle, WA (US); Stephen Roger Amorosi, Seattle, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 12/433,021

(22) Filed: Apr. 30, 2009

(65) Prior Publication Data

US 2010/0277346 A1 Nov. 4, 2010

(51) Int. Cl.
*G08B 21/00* (2006.01)
(52) U.S. Cl. .......... 340/686.1; 340/945; 340/686.2; 244/194; 244/203; 244/213
(58) Field of Classification Search .......... 340/945, 340/963, 686.1, 686.2; 324/522, 207.2; 701/3, 701/9, 14; 244/99.3, 203, 194, 213–215
See application file for complete search history.

(56) References Cited

U.S. PATENT DOCUMENTS

| 5,628,477 | A | * | 5/1997 | Caferro et al. ........... 244/214 |
| 5,680,124 | A | | 10/1997 | Bedell et al. |
| 5,686,907 | A | * | 11/1997 | Bedell et al. ........... 340/945 |
| 6,466,141 | B1 | | 10/2002 | McKay et al. |
| 6,483,436 | B1 | | 11/2002 | Emaci et al. |
| 6,930,489 | B2 | | 8/2005 | Schievelbusch et al. |
| 2004/0036477 | A1 | | 2/2004 | Schievelbusch et al. |
| 2007/0051183 | A1 | | 3/2007 | Schievelbusch |
| 2008/0265090 | A1 | | 10/2008 | Schievelbusch |

FOREIGN PATENT DOCUMENTS

| EP | 0726201 A1 | 8/1996 |
| EP | 1029784 A1 | 8/2000 |

OTHER PUBLICATIONS

GB Search Report for application GB1006849.2 dated Aug. 13, 2010.

* cited by examiner

*Primary Examiner* — Brent Swarthout
(74) *Attorney, Agent, or Firm* — Yee & Associates, P.C.

(57) ABSTRACT

An apparatus comprises a sensor system, a flexible line, and a sensor. The sensor system is capable of detecting skew in at least some of a plurality of control surfaces for a vehicle. The flexible line extends across a number of interfaces for a portion of the plurality of control surfaces. The sensor is connected to the flexible line and is capable of detecting the skew in the portion of the plurality of control surfaces in response to a selected amount of movement of the flexible line.

17 Claims, 7 Drawing Sheets

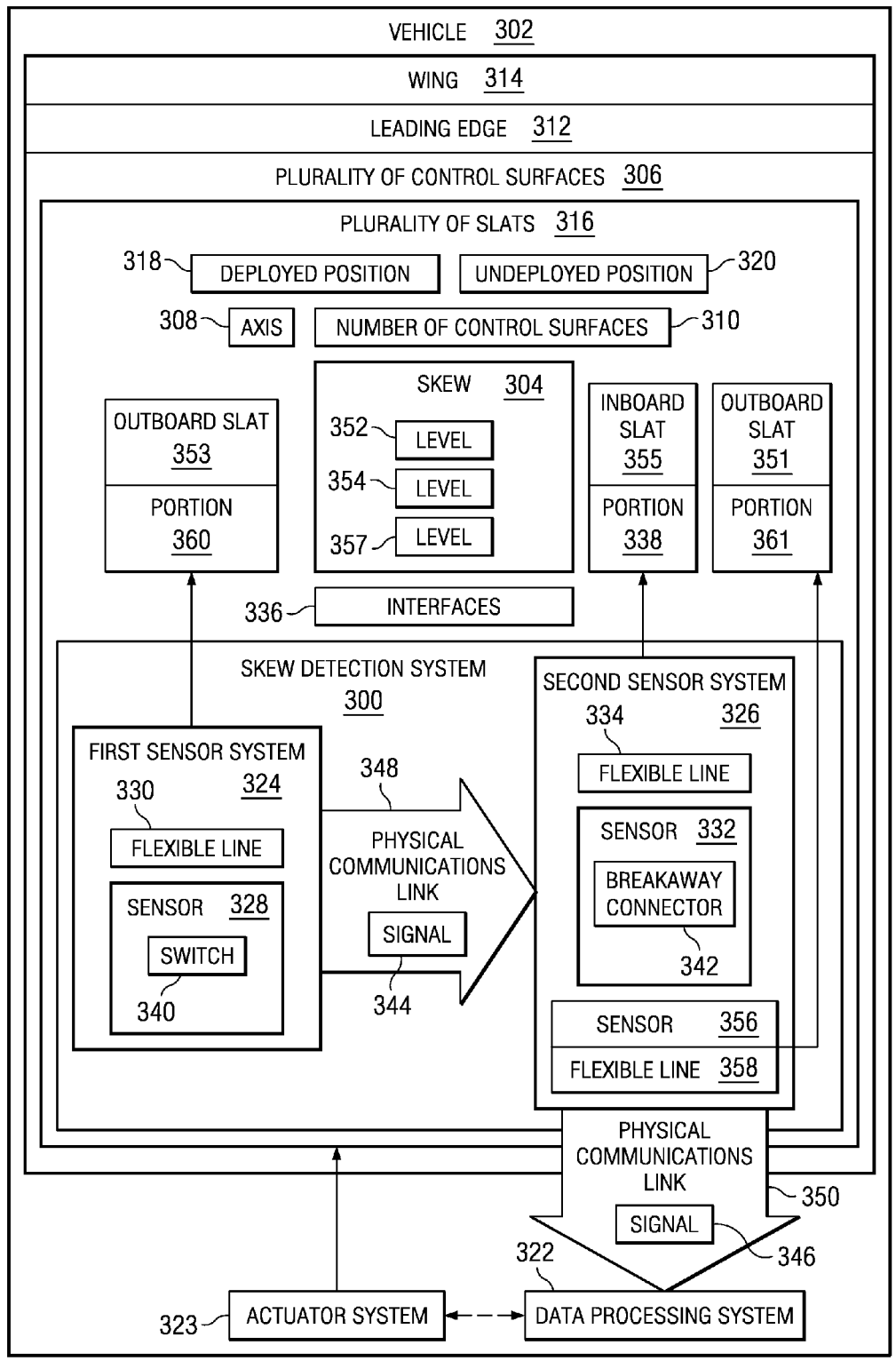

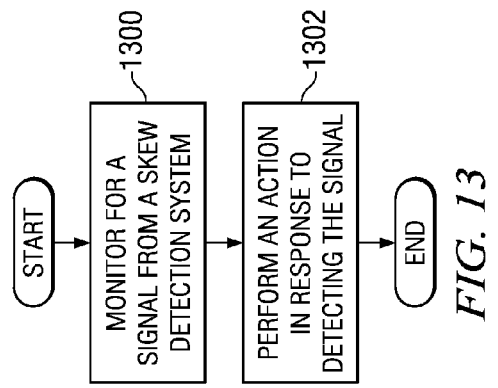
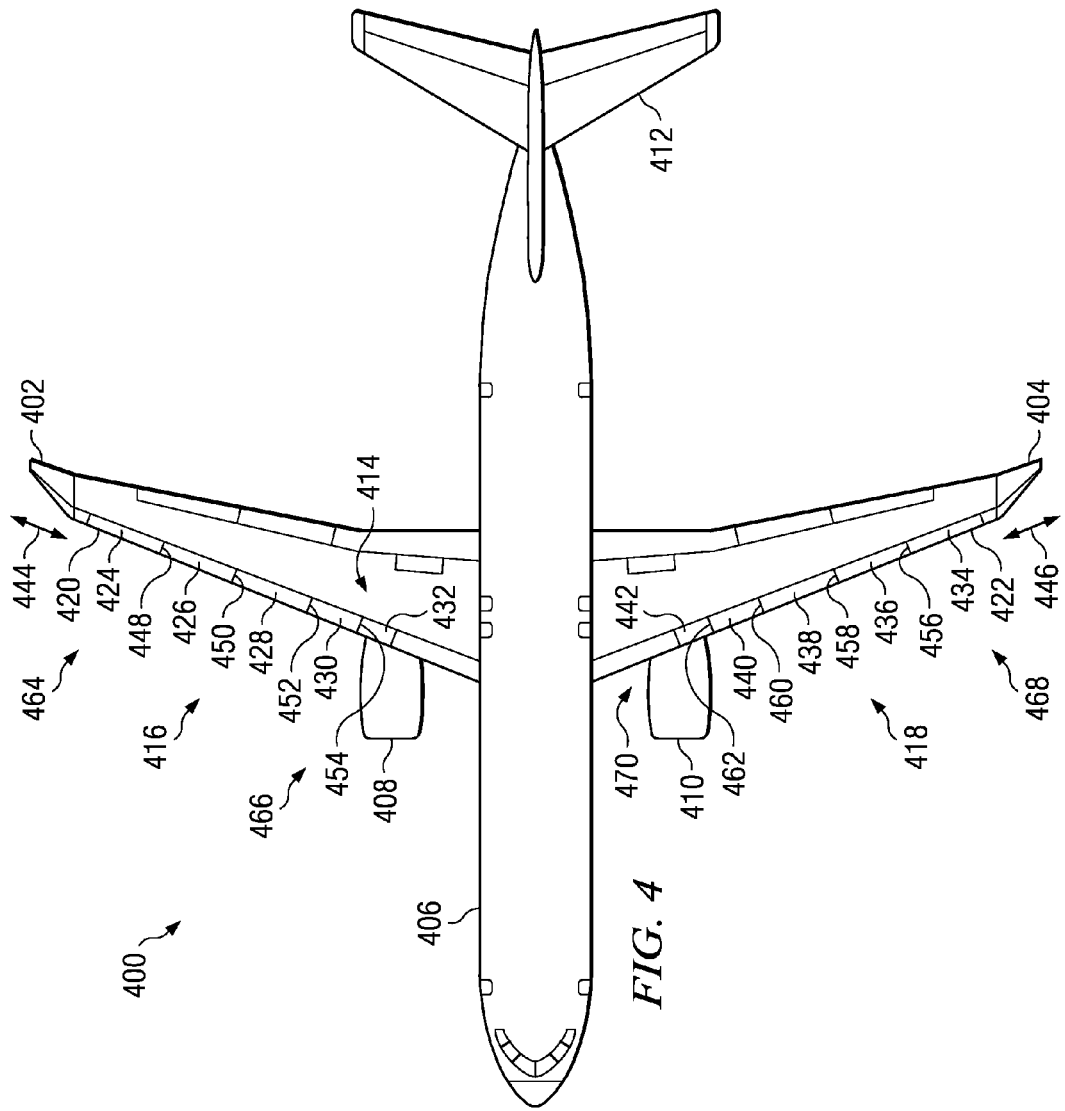

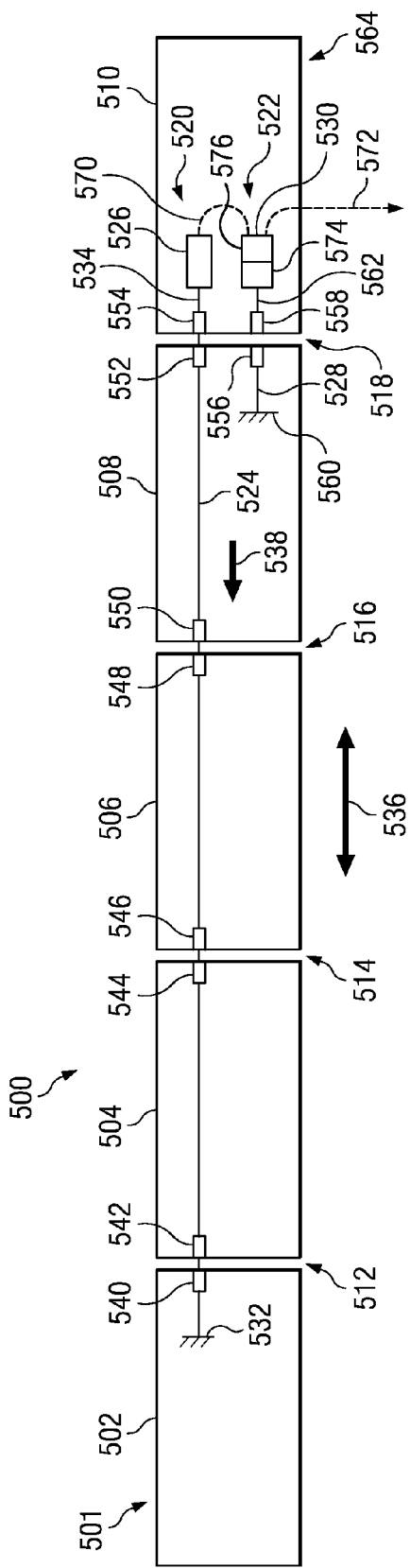
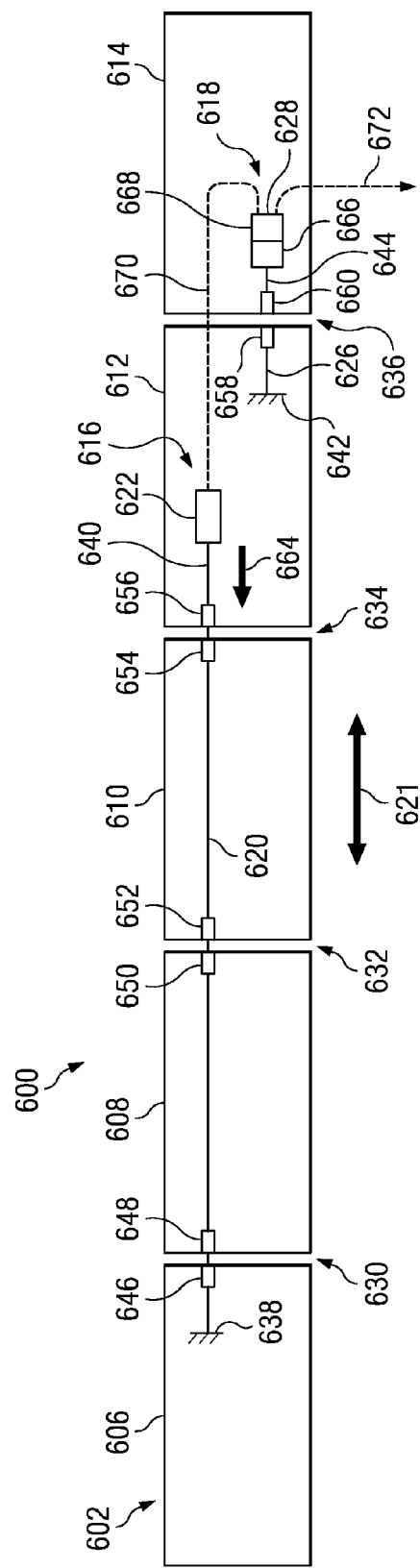

SLAT SKEW DETECTION SYSTEM

BACKGROUND INFORMATION

1. Field

The present disclosure relates generally to aircraft and, in particular, to a method and apparatus for detecting skew in slats on an aircraft.

2. Background

Flight control surfaces on an aircraft are used to maneuver and control the altitude of an aircraft. An aircraft may have many types of flight control surfaces. These flight control surfaces include, for example, ailerons, elevators, rudders, spoilers, flaps, slats, airbrakes, and/or other suitable control surfaces.

Slats are located on the leading edges of wings on a fixed-wing aircraft. Slats allow a wing to operate at a higher angle of attack when the slats are deployed as compared to when they are not deployed or used. An aircraft typically has multiple slats on each wing.

Each slat is typically driven between an extended and a retracted position using an actuator system. The movement of the slats is typically performed such that the slats are aligned. In other words, the slats may be moved such that they are substantially aligned along an axis.

A jam, a disconnect, and/or some other situation may cause one or more of the slats to fail to move in a manner that maintains alignment along an axis with the other slats. This misalignment in the slats may be referred to as skew. The amount of skew that is present may affect the aerodynamics of the aircraft. For example, if the degree of skew of one slat relative to the other slats is greater than some amount, the angle of attack that can be maintained for a wing at a given airspeed without stalling can change.

Skew detection systems are used on aircraft to detect skew in slats such that alerts may be generated and/or actions can be taken in case an undesired amount of skew occurs. Different types of skew detection systems are presently used on aircraft. For example, in one system, a long lanyard and sensor switch mechanism is employed. The lanyard spans the interfaces of the slats. Another slat skew detection system provides a sensor at the interface of each slat. The sensor detects relative motion between the two slats. In yet another skew detection system, a line is employed that passes through the slats with a cutting device. The cutting device cuts the line if the slats become skewed beyond some desired amount.

The different slat skew detection systems that are currently available may be more complex than desired. Some slat skew detection systems may increase the weight and complexity beyond desired levels. Further, the amount of skew detected by different systems may not provide the flexibility desired.

Therefore, the different advantageous embodiments recognize that it would be advantageous to have a method and apparatus that takes into account one or more of the issues described above, as well as possibly other issues.

SUMMARY

In one advantageous embodiment, an apparatus comprises a sensor system, a flexible line, and a sensor. The sensor system is capable of detecting skew in at least some of a plurality of control surfaces for a vehicle. The flexible line extends across a number of interfaces for a portion of the plurality of control surfaces. The sensor is connected to the flexible line and is capable of detecting the skew in the portion of the plurality of control surfaces in response to a selected amount of movement of the flexible line.

In another advantageous embodiment, a skew detection system for an aircraft comprises a first sensor system and a second sensor system. The first sensor system comprises a first flexible line and a first sensor. The first flexible line extends through a number of interfaces between a first plurality of control surfaces capable of becoming skewed. The first sensor is capable of generating a first signal in response to movement of the first flexible line by a first selected amount. The second sensor system comprises a second flexible line and a second sensor. The second flexible line extends through a second number of interfaces between a second plurality of control surfaces capable of becoming skewed. The second sensor is capable of generating a second signal in response to movement of the second flexible line by a second selected amount. The first flexible line is longer in length than the second flexible line. The first sensor system detects a different level of skew than the second sensor system. The first sensor system is connected in series with the second sensor system.

In yet another advantageous embodiment, a method is present for detecting skew. A signal is monitored from a skew detection system. The skew detection system comprises a sensor system, a flexible line, and a sensor. The sensor system is capable of detecting the skew in at least some of a plurality of control surfaces for a vehicle. The flexible line extends across a number of interfaces for a portion of the plurality of control surfaces. The sensor is connected to the flexible line and is capable of detecting the skew in the portion of the plurality of control surfaces in response to a selected amount of movement of the flexible line. In response to detecting the signal, an action is performed.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 3 is a diagram of a skew detection system in accordance with an advantageous embodiment;

FIG. 4 is a diagram of an aircraft in which an advantageous embodiment may be implemented;

FIG. 5 is a diagram illustrating a skew detection system in accordance with an advantageous embodiment;

FIG. 6 is a diagram illustrating a skew detection system in accordance with an advantageous embodiment;

FIG. 13 is a flowchart of a process for detecting skew in accordance with an advantageous embodiment.

DETAILED DESCRIPTION

Figure 1:
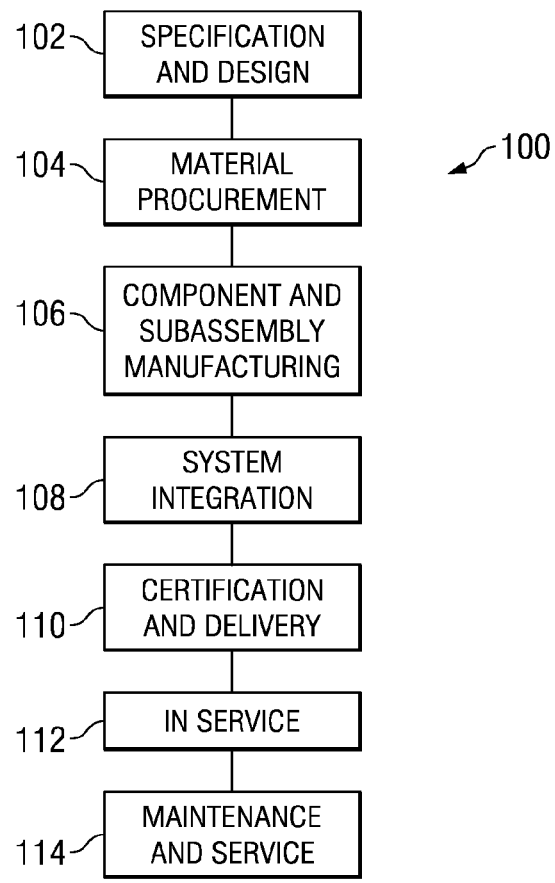
FIG. 1 is a diagram illustrating an aircraft manufacturing and service method in accordance with an advantageous embodiment.
Figure 2:
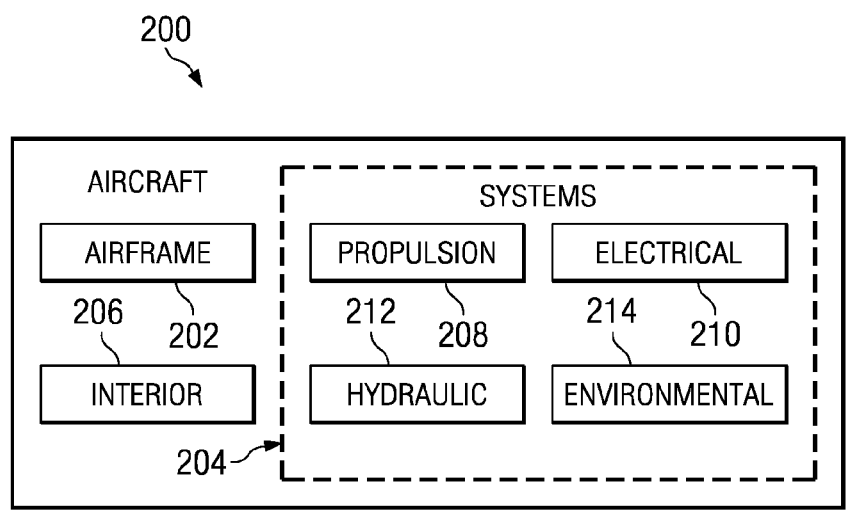
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, different advantageous embodiments for a skew detection system may be implemented during component and subassembly manufacturing 106. As yet another example, one or more advantageous embodiments for a skew detection system may be implemented during maintenance and service 114. With this type of implementation, the skew detection system may be added as part of maintenance, reconfiguration, modification, and/or some other change to aircraft 200 after aircraft 200 has been in use.

The different advantageous embodiments recognize and take into account a number of different considerations. For example, the different advantageous embodiments recognize and take into account that using a lanyard and a sensor may not provide the amount of sensitivity desired for a skew detection system. With this type of skew detection system, the lanyard may take into account air loads, thermal effects, manufacturing tolerances, and/or other parameters for the slats. As a result, in taking into account these different factors, the sensitivity of the skew detection system may be reduced.

The different advantageous embodiments recognize and take into account that using a line cutting mechanism to detect resistant changes in the line resistance may be subject to false indications. For example, vibrations may cause premature cutting of detection line. Also, the cutting edge may become dull over time with reduced effectiveness. Further, with this type of system, the different advantageous embodiments also recognize and take into account that detecting a skew event requires replacement of the line.

The different advantageous embodiments also recognize and take into account that placing sensors at every interface increases the complexity and weight of a skew detection system. Weight is increased for adding additional sensors and lines needed for detecting skew between each interface between slats.

Thus, the different advantageous embodiments provide a method and apparatus for detecting skew in control surfaces. The different advantageous embodiments may comprise a first sensor system capable of detecting skew in at least some of the plurality of control surfaces for a vehicle. In other words, the first sensor system may be capable of detecting skew in all of the plurality of control surfaces or a portion of the plurality of control surfaces. The first sensor system is capable of generating a signal to indicate a presence of the skew.

The apparatus also includes a flexible line extending across a number of interfaces for a portion of the plurality of control surfaces. A sensor is connected to the flexible line. The sensor is capable of indicating a presence of skew between the portion of the plurality of control surfaces in response to a selected movement of the flexible line. The first sensor system is capable of detecting skew with a different amount of sensitivity as compared to the flexible line and the sensor.

Turning now to FIG. 3, a diagram of a skew detection system is depicted in accordance with an advantageous embodiment. Skew detection system 300 may be implemented in vehicle 302. In particular, vehicle 302 may take the form of aircraft 200 in FIG. 2. Skew detection system 300 may detect a presence of skew 304 in at least a portion of plurality of control surfaces 306.

In these illustrative examples, plurality of control surfaces 306 is aligned about axis 308. If number of control surfaces 310 is not aligned along axis 308, plurality of control surfaces 306 may be considered to have skew 304. A number, as used herein, refers to one or more items. For example, a number of control surfaces is one or more control surfaces.

Plurality of control surfaces 306 may take various forms. For example, plurality of control surfaces 306 may be located on leading edge 312 on wing 314 for vehicle 302. In these illustrative examples, plurality of control surfaces 306 may take the form of plurality of slats 316. Plurality of slats 316 may have deployed position 318 and undeployed position 320. Further, plurality of slats 316 may be moved to any number of positions between deployed position 318 and undeployed position 320.

Skew 304 is present if, for example, plurality of slats 316 is not aligned along axis 308 during movement of plurality of slats 316 from undeployed position 320 to deployed position 318 and/or when plurality of slats 316 finishes moving to deployed position 318. Additionally, skew 304 also may occur from moving plurality of slats 316 from deployed position 318 to undeployed position 320.

In the different illustrative examples, data processing system 322 may control actuator system 323. Actuator system 323 moves plurality of control surfaces 306 to different positions, such as undeployed position 320 and deployed position 318.

Skew detection system 300, in these illustrative examples, includes first sensor system 324 and second sensor system 326. These sensor systems are used in these illustrative examples to detect skew 304 in plurality of slats 316. First sensor system 324 comprises sensor 328 and flexible line 330. Second sensor system 326 comprises sensor 332 and flexible line 334.

In these illustrative examples, flexible line 330 in first sensor system 324 extends across at least a portion of interfaces 336 for plurality of slats 316. Each interface in interfaces 336 is a gap between a slat and an adjacent slat in plurality of slats 316.

In the different advantageous embodiments, first sensor system 324 monitors for skew 304 in plurality of control surfaces 306. Second sensor system 326 monitors for skew 304 in portion 338 of plurality of control surfaces 306.

In the different advantageous embodiments, second sensor system 326 is placed in series with first sensor system 324. In the illustrative examples, first sensor system 324 and second sensor system 326 are considered to be in series because the signals generated by the sensor systems are in series. The physical arrangement of the different components of the sensor systems is not arranged in series. In this illustrative example, second sensor system 326 provides a connection from first sensor system 324 to data processing system 322.

In the illustrative examples, sensor 328 and sensor 332 may be implemented using a number of different types of sensors. For example, sensor 328 may be implemented using switch 340, while sensor 332 may be implemented using breakaway connector 342. Of course, any type of sensor may be used, depending on the particular implementation. For example, without limitation, a sensor may be implemented using a switch, a breakaway connector, a position sensor, a contact switch, a Hall effect switch, and/or some other suitable type of sensor.

Flexible line 330 and flexible line 334 may be implemented using a number of different types of flexible lines. In these illustrative examples, flexible line 330 and flexible line 334 may be implemented using, for example, without limitation, a cable, a lanyard, a line, a rope, and/or some other suitable type of flexible line. Flexible line 330 and flexible line 334 may be implemented using any type of line that may be flexible. Flexible line 330 and flexible line 334 are capable of activating sensor 328 and sensor 332, respectively, when some selected amount of movement is applied to flexible line 330 and/or flexible line 334 away from sensor 328 and sensor 332.

For example, sensor 328 may generate signal 344 indicating a presence of skew 304 if flexible line 330 is moved some selected distance in a direction in relation to sensor 328. In a similar fashion, sensor 332 may generate signal 346 in response to a movement of flexible line 334 by some distance in a direction in relation to sensor 332. In these illustrative examples, the movement is a movement of the particular flexible line away from the associated sensor.

In some advantageous embodiments, the force generated by the selected amount of movement may cause the generation of signal 344 or signal 346. Of course, the amount of movement or force that may be required may be different for sensor 328 and sensor 332.

In these illustrative examples, first sensor system 324 is connected to second sensor system 326 using physical communications link 348. Second sensor system 326 is connected to data processing system 322 using physical communications link 350. Physical communications link 348 is an example of how second sensor system 326 may be connected in series with first sensor system 324.

In these illustrative examples, physical communications link 348 and physical communications link 350 may be selected from any physical media that is capable of transmitting at least one of signal 344 and/or signal 346 from first sensor system 324 and/or second sensor system 326, respectively. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Signal 344 and/or signal 346 may be, for example, a binary signal that may be a positive signal, a negative signal, an increase in voltage, a decrease in voltage, a signal having a selected voltage level, a signal having a selected amount of current, and/or some other type of signal. In some advantageous embodiments, signal 346 may be an absence of a voltage in which an open circuit has occurred. This type of signal may occur when sensor 332 in second sensor system 326 is implemented using a switch or breakaway connector.

In these different advantageous embodiments, physical communications link 348 and/or physical communications link 350 may be implemented using at least one of an electrical line, a coaxial cable, an optical fiber, and/or some other suitable physical communications media.

First sensor system 324 may be selected to provide a different level of sensitivity as compared to second sensor system 326. In these illustrative examples, first sensor system 324 may detect level 352 of skew 304, while second sensor system 326 may detect level 354 of skew 304.

In one example, level 352 of skew 304 detected by first sensor system 324 is a larger amount of skew as compared to level 354 of skew 304 detected by second sensor system 326. This difference between level 352 and level 354 may occur because first sensor system 324 is less sensitive and detects larger amounts of skew 304. This situation may occur as the length of flexible line 330 increases.

In these illustrative examples, the length of flexible line 334 may be shorter than the length of flexible line 330 such that second sensor system 326 is more sensitive to smaller levels of skew as compared to first sensor system 324. As a result, first sensor system 324 may not be as sensitive as second sensor system 326.

In this manner, skew detection system 300 may be capable of detecting different levels of skew 304 in a manner that uses less sensors, wiring, and/or components as compared to currently available systems. As another illustrative example, skew detection system 300 may provide an ability to detect smaller values for level 354 of skew 304 at inboard slat 355 of plurality of slats 316 using second sensor system 326.

In these illustrative examples, sensor 328 in first sensor system 324 and at least one of sensor 332 and sensor 356 in second sensor system 326 are connected in series. Flexible line 330, flexible line 334, and flexible line 358, however, are not connected in series. This type of arrangement may provide a capability to detect different levels of skew 304.

Further, second sensor system 326 in skew detection system 300 may be capable of detecting smaller or larger amounts of skew as compared to first sensor system 324 at inboard slat 355 of plurality of slats 316. In these illustrative examples, outboard slat 353 is a slat located in a portion of wing 314 further away from the body of vehicle 302. Inboard slat 355 is a slat located in a portion of wing 314 closer to the body of vehicle 302.

In the different advantageous embodiments, this detection in outboard slat 353 and inboard slat 355 may be accomplished by placing sensor 332 and flexible line 334 at portion 360 located around outboard slat 353.

Additionally, second sensor system 326 also may include sensor 356 and flexible line 358 at portion 361 located around outboard slat 351 of plurality of slats 316. Of course, portion 360, portion 361, and portion 338 may be located in different locations in plurality of slats 316, depending on level 354 of skew 304 to be detected. In this example, level 357 of skew 304 is detected by sensor 356. Level 357 of skew 304 may be greater than level 352 of skew 304 and level 354 of skew 304.

In these illustrative examples, flexible line 334 and flexible line 358 may be shorter than flexible line 330. With a shorter length for flexible line 334 and/or flexible line 358, a different level of skew 304 may be detected. Further, with a shorter length for flexible line 334 and flexible line 358 as compared to flexible line 330, errors that may occur with a longer length in flexible line 330 may be reduced and/or avoided. In addition, with second sensor system 326, skew 304, in specific portions, such as portion 338 and portion 360 of plurality of slats 316, may be detected.

In these illustrative examples, the sensitivity for second sensor system 326 may be set as an amount of movement out of alignment from axis 308 for the level of skew 304 that is desired to be detected using second sensor system 326. The skew between an interface within interfaces 336 causes pull or force along flexible line 330 and/or flexible line 334. When the level of skew between the slats at the interface is great enough, sensor 328 and/or sensor 332 may be triggered.

Further, skew detection system 300 may have a lower level of complexity, expense, and maintenance as compared to currently available skew detection systems.

When signal 344 and/or signal 346 are generated, data processing system 322 may generate an alert, generate an error message, and/or shut down operation of plurality of slats 316, depending on the particular implementation.

The illustration of skew detection system 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in other advantageous embodiments, skew detection system 300 may be employed to monitor multiple groupings of slats on different wings. These different groupings may or may not overlap, depending on the particular implementation. In yet other advantageous embodiments, second sensor system 326 may be used without first sensor system 324. In some advantageous embodiments, first sensor system 324 may be implemented using a different type of skew detection system as compared to second sensor system 326.

In yet other advantageous embodiments, second sensor system 326 may not be in series with first sensor system 324. Instead, first sensor system 324 may be connected directly to data processing system 322, and second sensor system 326 also may be directly connected to data processing system 322. In still yet other advantageous embodiments, data processing system 322 may control actuator system 323, while another data processing system or computer may receive signal 344 and/or signal 346. As yet another example, in some advantageous embodiments, second sensor system 326 may include only sensor 332 and flexible line 334. Sensor 356 and flexible line 358 may be omitted in some advantageous embodiments.

With reference now to FIG. 4, a diagram of an aircraft is depicted in which an advantageous embodiment may be implemented. Aircraft 400 is an example of one implementation of aircraft 200 in FIG. 2. In this illustrative example, aircraft 400 has wings 402 and 404 attached to fuselage 406. Aircraft 400 includes wing mounted engine 408, wing mounted engine 410, and tail 412.

In this illustrative example, aircraft 400 implements skew detection environment 414. Skew detection environment 414 is an example of one implementation for skew detection system 300 in FIG. 3. In this illustrative example, aircraft 400 has plurality of slats 416 and plurality of slats 418. As can be seen in this illustrative example, plurality of slats 416 is located on leading edge 420 of wing 402, while plurality of slats 418 is located on leading edge 422 of wing 404. Plurality of slats 416 includes slats 424, 426, 428, 430, and 432. Plurality of slats 418 includes slats 434, 436, 438, 440, and 442.

As can be seen in this illustrative example, plurality of slats 416 is aligned along axis 444, while plurality of slats 418 is aligned along axis 446. Plurality of slats 416 has interfaces 448, 450, 452, and 454 between each of the slats. Interfaces 456, 458, 460, and 462 are present between plurality of slats 418. Slat 424 is an outboard slat and is located at outboard portion 464 of wing 402, and slat 432 is also an outboard slat, which is the most inboard slat of plurality of slats 416. Slat 434 is an outboard slat and is located at outboard portion 468 of wing 404, and slat 442 also is an outboard slat, which is the most inboard slat of plurality of slats 418.

In this illustrative example, an inboard slat is a slat located closest to fuselage 406 and inboard of wing mounted engines 408 and 410. An outboard slat is a slat located farther away from fuselage 406 and outboard of wing mounted engines 408 and 410.

Turning now to FIG. 5, a diagram illustrating a skew detection system is depicted in accordance with an advantageous embodiment. In this illustrative example, skew detection system 500 is an example of one implementation for skew detection system 300 in FIG. 3. As can be seen in this example, plurality of slats 501 includes slats 502, 504, 506, 508, and 510. Plurality of slats 501 is similar to slats 434, 436, 438, 440, and 442 in FIG. 4. In this illustrative example, slat 502 is an outboard slat and is located in an outboard position with respect to the fuselage, while slat 510 is an inboard slat and is located in an inboard position with respect to the fuselage.

Interfaces 512, 514, 516, and 518 are present between plurality of slats 501. In particular, interface 512 is present between slat 502 and slat 504. Interface 514 is present between slat 504 and slat 506. Interface 516 is present between slat 506 and slat 508. Interface 518 is present between slat 508 and slat 510.

Skew detection system 500 includes sensor system 520 and sensor system 522. In this illustrative example, sensor system 520 and sensor system 522 are used to detect skew that may occur between plurality of slats 501. Sensor system 520 detects skew between all of plurality of slats 501, while sensor system 522 detects skew between a portion of plurality of slats 501. In this example, sensor system 522 detects skew between slat 508 and slat 510.

Sensor system 520 comprises flexible line 524 and sensor 526. Sensor system 522 comprises flexible line 528 and sensor 530. In this illustrative example, sensor 526 is a switch, while sensor 530 is a breakaway connector. Sensor 526 and sensor 530 are located on slat 510 in these illustrative examples. End 532 of flexible line 524 is connected to slat 502. End 534 of flexible line 524 is connected to sensor 526. Flexible line 524 runs through guides 540, 542, 544, 546, 548, 550, 552, and 554. Flexible line 528 passes through guides 556 and 558. End 560 of flexible line 528 is connected to slat 508. End 562 of flexible line 528 is connected to sensor 530.

If plurality of slats 501 moves in a manner that causes them to move out of alignment with respect to axis 536 by some amount, flexible line 524 will move in the direction of arrow 538 in an amount such that sensor 526 is actuated in a manner to generate a signal indicating that skew is present. The amount of movement out of alignment that may occur with respect to axis 536 may be selected by identifying the amount of movement of flexible line 524 in the direction of arrow 538 that actuates sensor 526.

In these illustrative examples, the movement in the direction of arrow 538 may take into account factors, such as air loads, thermal effects, manufacturing tolerances, and/or other features. As a result, the sensitivity to skew may be lower because of taking into account these different factors.

In these illustrative examples, sensor system 522 may be more sensitive to less movement or a lower amount of skew between slat 508 and slat 510. This lower amount of skew that may be detected using sensor system 522 may provide greater sensitivity at inboard portion 564.

The amount of movement of flexible line 528 in the direction of arrow 538 is approximately the same as flexible line 524 in the direction of arrow 538. However, the threshold for actuation of sensor 530 is set to a lower amount of movement than sensor 526 in this illustrative example. This lower threshold provides greater sensitivity to detect smaller amounts of skew. Further, flexible line 528 is shorter than flexible line 524. As a result, flexible line 528 may be less sensitive to factors, such as air loads, thermal effects, manufacturing tolerances, and other suitable factors.

Sufficient movement of flexible line 528 in the direction of arrow 538 may cause section 574 to detach from section 576 of sensor 530. This detachment causes an open circuit, which may generate a signal. The signal may be a lack of voltage or a drop in voltage due to the open circuit condition. Sufficient movement of flexible line 524 in the direction of arrow 538 may activate sensor 526 to generate a signal, such as a drop in voltage or an open circuit condition.

In this illustrative example, sensor system 520 is located in series with sensor system 522. Link 570 connects sensor 526 to sensor 530. Link 572 connects sensor 530 to another component, such as a computer or a data processing system.

With reference now to FIG. 6, a diagram illustrating a skew detection system is depicted in accordance with an advantageous embodiment. Skew detection system 600 is an example of one implementation for skew detection system 300 in FIG. 3.

In this example, skew detection system 600 is used to detect skew between plurality of slats 602. Plurality of slats 602 includes slats 606, 608, 610, 612, and 614. In this illustrative example, skew detection system 600 includes sensor system 616 and sensor system 618. Sensor system 616 detects skew in some of plurality of slats 602.

In these depicted examples, sensor system 616 detects skew between slats 606, 608, 610, and 612. Sensor system 618 detects skew between slats 612 and 614. As can be seen here, the different sensor systems may detect skew between different portions of plurality of slats 602. Skew is detected when one or more portions of plurality of slats 602 is out of alignment with respect to axis 621.

Sensor system 616 includes flexible line 620 and sensor 622. Sensor system 618 includes flexible line 626 and sensor 628. In these illustrative examples, sensor system 616 detects skew at interfaces 630, 632, and 634. Sensor system 618 may detect skew at interface 636.

Sensor 622, in this example, is located on slat 612. Sensor 628 is located on slat 614. End 638 of flexible line 620 is connected to slat 606, while end 640 of flexible line 620 is connected to sensor 622. End 642 of flexible line 626 is connected to slat 612, while end 644 of flexible line 626 is connected to sensor 628. In this illustrative example, flexible line 620 extends through guides 646, 648, 650, 652, 654, and 656. Flexible line 626 runs through guides 658 and 660.

Sensor system 616 may require greater movement of flexible line 620 in the direction of arrow 664 as compared to the movement of flexible line 626. Sufficient movement of flexible line 620 due to misalignment of slats 606, 608, 610, and 612 may cause activation of sensor 622. Sufficient movement of flexible line 626 in the direction of arrow 664 may cause section 666 to detach from section 668 in sensor 628.

Sensor system 618 is in series with sensor system 616. Physical communications link 670 connects sensor 622 to sensor 628. Sensor 628 is connected to another device, such as a computer or a data processing system, using physical communications link 672.

In this illustrative example, sensor system 616 and sensor system 618 may detect different levels of skew. The different levels of skew detected may be due to the varying sensitivities of sensor system 616 and sensor system 618. For example, sensor 628 in sensor system 618 may detect a lower level of skew than sensor 622 in sensor system 616.

Figure 7:
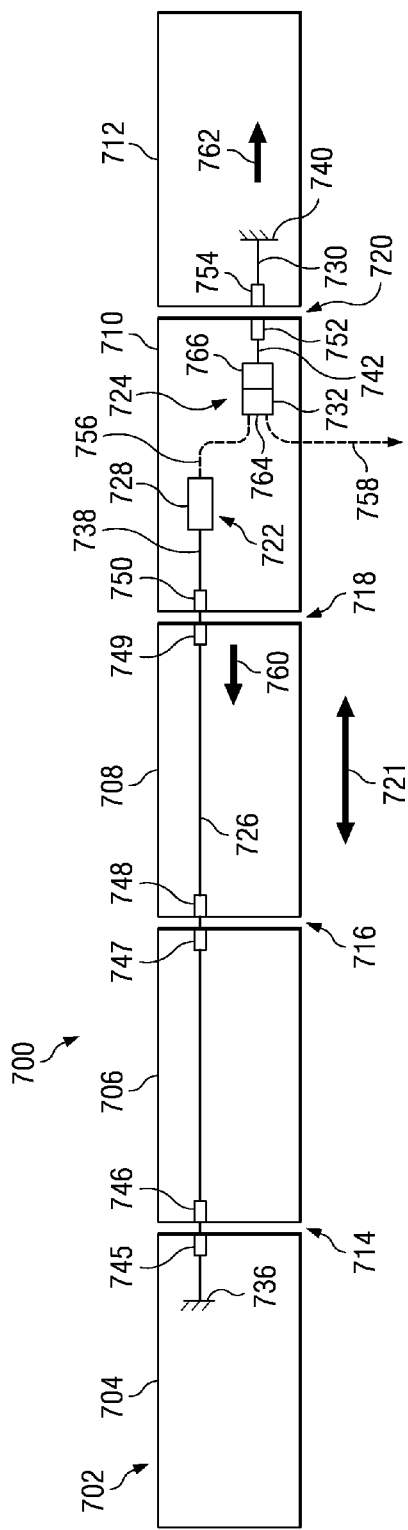
FIG. 7 is a diagram illustrating a skew detection system in accordance with an advantageous embodiment.

Turning now to FIG. 7, a diagram illustrating a skew detection system is depicted in accordance with an advantageous embodiment. Skew detection system 700 is an example of an implementation of skew detection system 300 in FIG. 3.

In this illustrative example, skew detection system 700 is used to detect skew in plurality of slats 702. Plurality of slats 702 includes slats 704, 706, 708, 710, and 712. Slat 704 is an outboard slat and is located in an outboard position with respect to the fuselage, while slat 712 is an inboard slat and is located in an inboard position with respect to the fuselage. Interfaces 714, 716, 718, and 720 are present between plurality of slats 702.

Skew detection system 700, in this example, includes sensor system 722 and sensor system 724. Sensor system 722 comprises flexible line 726 and sensor 728. Sensor system 724 comprises flexible line 730 and sensor 732.

In this example, both sensor 728 and sensor 732 are located on slat 710. Flexible line 726 has end 736 connected to slat 704 and end 738 connected to sensor 728. Flexible line 730 has end 740 connected to slat 712 and end 742 connected to sensor 732. Flexible line 726 extends across the slats through guides 745, 746, 747, 748, 749, and 750. Flexible line 730 extends across interface 720 through guides 752 and 754.

Sensor system 722 detects skew between slats 704, 706, 708, and 710 in plurality of slats 702. Sensor system 724 detects skew between slats 710 and 712. Skew is detected when one or more portions of plurality of slats 702 is out of alignment by some selected amount with respect to axis 721.

Sensor system 722 is in series with sensor system 724. Physical communications link 756 connects sensor 728 to sensor 732. Physical communications link 758 connects sensor 732 to another device, such as a data processing system or a computer. Sufficient movement of flexible line 726 in the direction of arrow 760 causes activation of sensor 728. Sufficient movement of flexible line 730 in the direction of arrow 762 may cause section 764 in sensor 732 to detach from section 766 of sensor 732.

In this illustrative example, sensor system 722 and sensor system 724 may detect different levels of skew. The level of skew detected by sensor system 724 detects a lower level of skew detected by sensor system 722 in this illustrative example.

Figure 8:
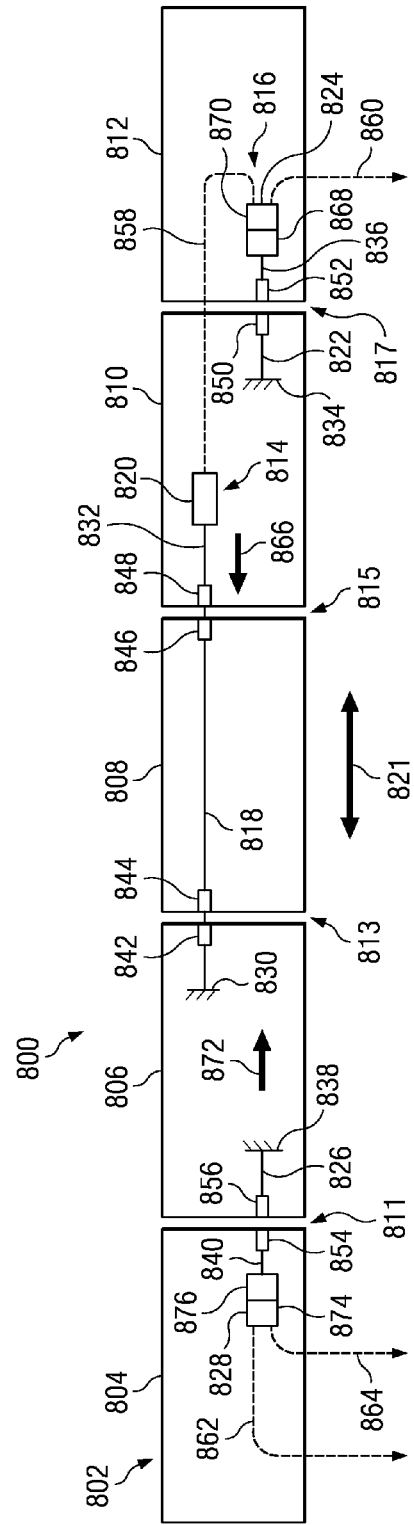
FIG. 8 is a diagram of a skew detection system in accordance with an advantageous embodiment.

Turning now to FIG. 8, a diagram of a skew detection system is depicted in accordance with an advantageous embodiment. In this example, skew detection system 800 is an example of another implementation for skew detection system 300 in FIG. 3.

Skew detection system 800 may be used to detect skew in plurality of slats 802. Plurality of slats 802 includes slats 804, 806, 808, 810, and 812. Slat 804 is an outboard slat, while slat 812 is an inboard slat.

In this illustrative example, skew detection system 800 includes sensor system 814 and sensor system 816. Sensor system 814 includes flexible line 818 and sensor 820. Sensor system 816, in this example, includes flexible line 822, sensor 824, flexible line 826, and sensor 828. In this illustrative example, sensor system 814 detects skew in some of plurality of slats 802. Sensor system 814 detects skew in interfaces 813 and 815. Sensor system 816 detects skew between a portion of plurality of slats 802. Sensor system 816 may detect skew in interfaces 811 and 817. Skew is detected when one or more portions of plurality of slats 802 is out of alignment with respect to axis 821.

In this illustrative example, flexible line 818 has end 830 attached to slat 806 and end 832 attached to sensor 820. In sensor system 816, flexible line 822 has end 834 attached to slat 810 and end 836 attached to sensor 824. Flexible line 826 has end 838 attached to slat 806 and end 840 attached to sensor 828. Flexible line 818 extends through guides 842, 844, 846, and 848. Flexible line 822 extends through guides 850 and 852. Flexible line 826 extends through guides 854 and 856 in these examples.

A portion of sensor system 816 is connected in series with sensor system 814. In these illustrative examples, the series connection is provided by the connection of sensor 820 and sensor 824 with physical communications link 858 and physical communications link 860. Physical communications link 858 connects sensor 820 to sensor 824. Physical communications link 860 connects sensor 828 to a computer or other device. Sensor 828 has communications link 862 and 864 connected to a computer.

In these illustrative examples, one of communications link 862 and communications link 864 may be connected to a position sensor and/or other circuit. The other communications link may be connected to a computer. These connections for sensor 828 may provide a series connection with the circuit or position sensor. As a result, sensor 828 may generate a signal in the form of an open circuit.

Sensor 820 generates a signal indicating that skew is present when flexible line 818 moves a sufficient distance in the direction of arrow 866. In a similar fashion, sensor 824 generates a signal indicating skew when flexible line 822 moves a sufficient distance in the direction of arrow 866. In this illustrative example, the amount of movement for flexible line 822 is less than flexible line 818.

When sufficient movement of flexible line 822 occurs, section 868 separates from section 870 in sensor 824. This separation causes a disruption of the paths for physical communications link 858 and physical communications link 860. Further, this separation causes an open circuit to occur that generates a signal indicating that skew is present.

In a similar fashion, sensor 828 generates a signal indicating that skew is present when flexible line 826 moves a sufficient distance in the direction of arrow 872. This movement causes section 874 to separate from section 876 in sensor 828. This separation causes an open circuit in the illustrative examples.

In this illustrative example, sensor system 814 and sensor system 816 may detect different levels of skew. For example, sensor 820, sensor 824, and sensor 828 may each detect different levels of skew. For example, sensor 824 may detect a lower level of skew than sensor 820. Sensor 828 may also detect a lower level of skew than sensor 820. These levels of skew may be set by the amount of movement of the flexible lines connected to the sensors that cause the sensors to generate a signal.

Figure 9:
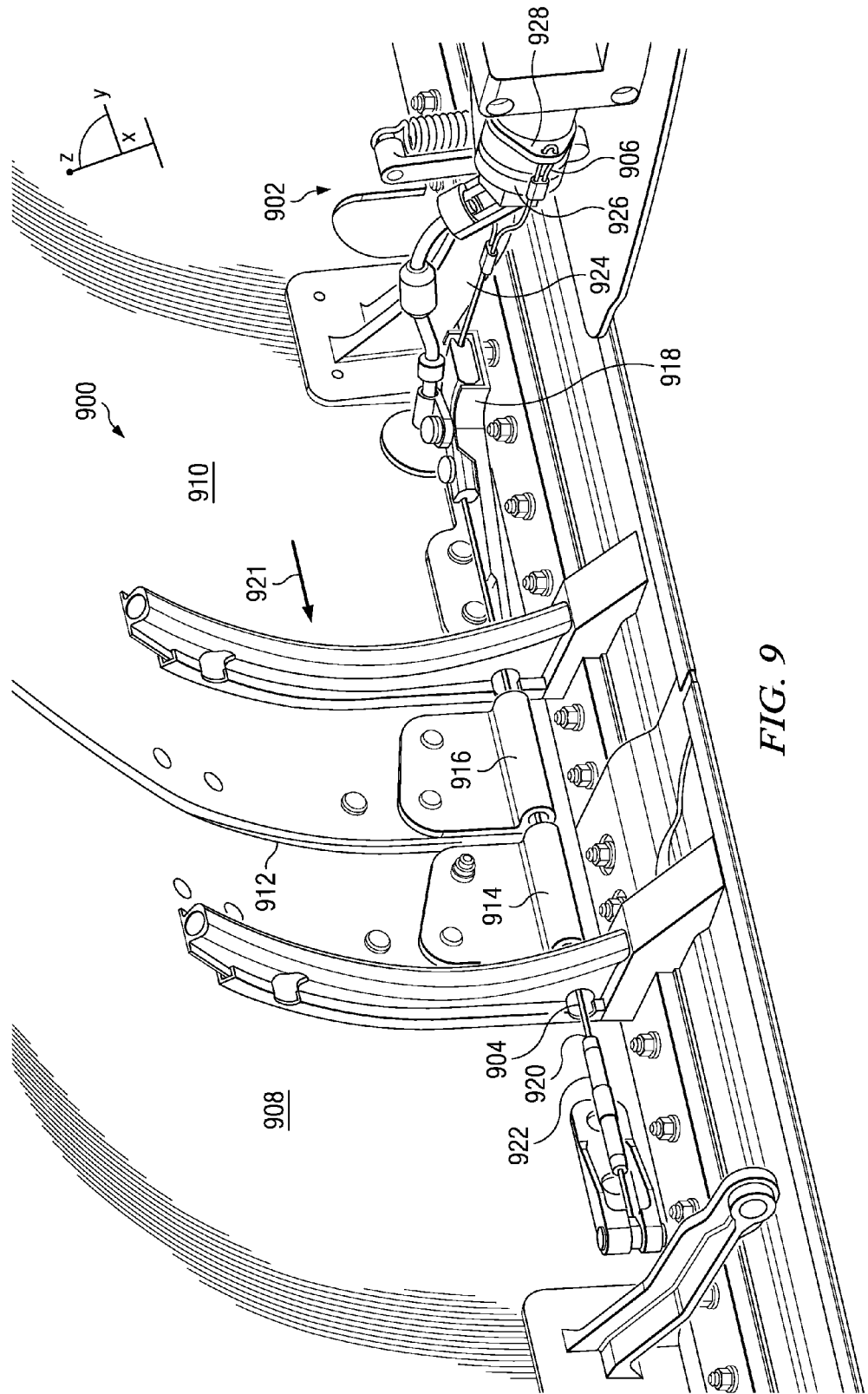
FIG. 9 is an illustration of a portion of a skew detection system in accordance with an advantageous embodiment.

Turning now to FIG. 9, an illustration of a portion of a skew detection system is depicted in accordance with an advantageous embodiment. In this example, skew detection system 900 is an example of one implementation of skew detection system 300 in FIG. 3. In this illustrative example, sensor system 902 is an example of second sensor system 326 in FIG. 3.

In this depicted example, sensor system 902 includes flexible line 904 and sensor 906. In this illustrative example, sensor 906 takes the form of a breakaway connector. Flexible line 904 is connected to sensor 906. In this illustrative example, flexible line 904 extends across slats 908 and 910 and across interface 912 between slat 908 and slat 910. An interior view of slat 908 and slat 910 is depicted in accordance with an advantageous embodiment.

Flexible line 904 extends through guides 914, 916, and 918. End 920 of flexible line 904 is connected to turn buckle 922 on slat 908. End 924 of flexible line 904 is connected to sensor 906. In these illustrative examples, sufficient movement of flexible line 904 in the direction of arrow 921 may cause section 926 to separate from section 928 in sensor 906. This separation may generate a signal indicating that skew occurs. The amount of movement of flexible line 904 depends on the level of skew that sensor system 902 is configured to detect.

The illustrations of the different skew detection systems in FIGS. 4-9 are only meant as examples of some implementations for skew detection system 300 in FIG. 3. These illustrations are not meant to limit the manner in which other skew detection systems may be implemented in accordance with one or more advantageous embodiments.

Figure 10:
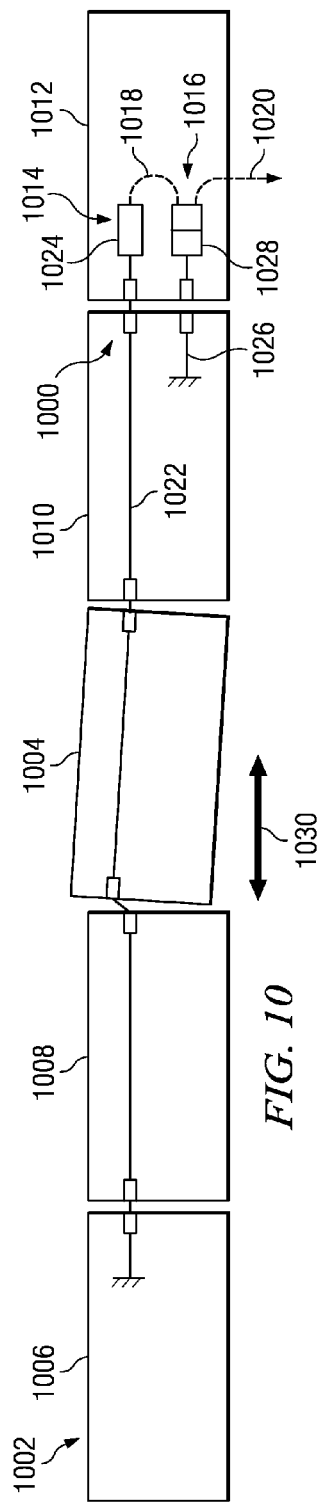
FIGS. 10-12 are diagrams illustrating skew detected by skew detection systems in accordance with an advantageous embodiment.
Figure 11:
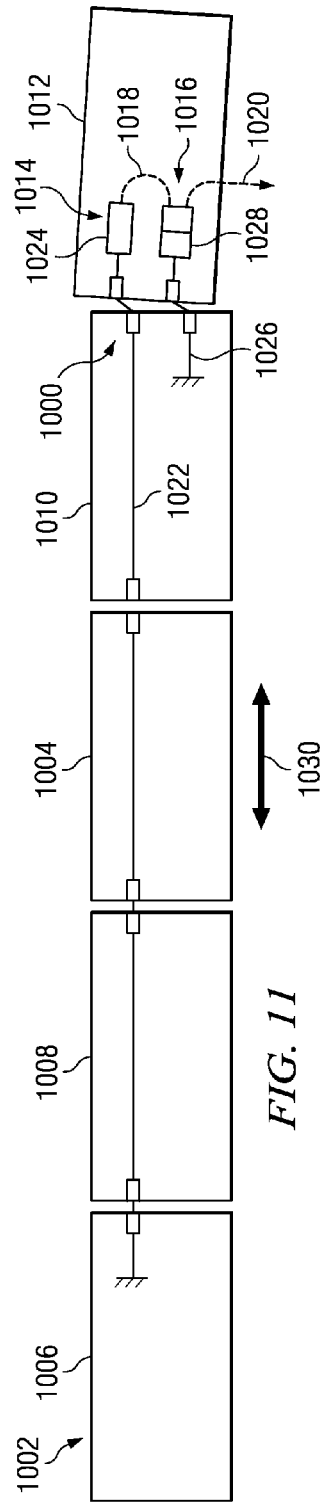
Figure 12:
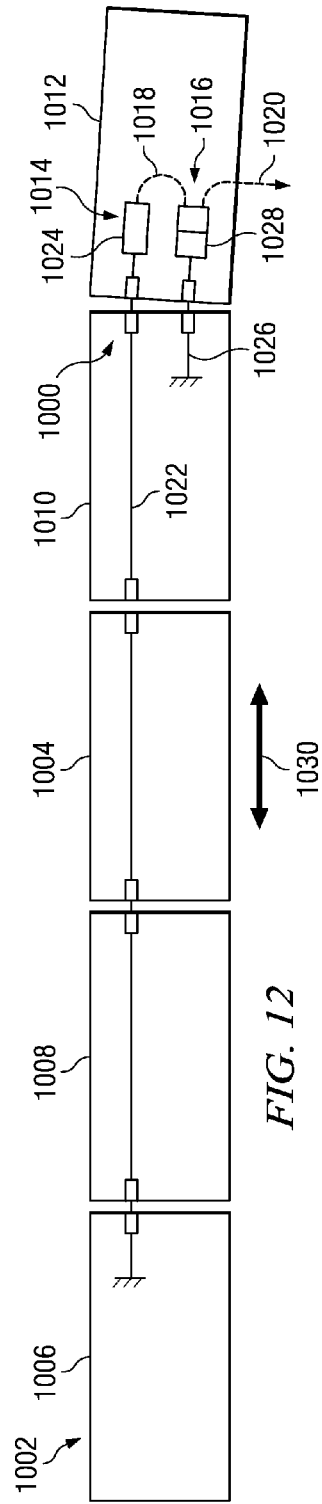

Turning now to FIGS. 10-12, diagrams illustrating skew detected by skew detection systems are depicted in accordance with an advantageous embodiment. In FIG. 10, a skew detection system is depicted in accordance with an advantageous embodiment. As illustrated in this example, skew detection system 1000 may be used to detect skew in plurality of control surfaces 1002. In this example, control surface 1004 fails at the left outboard side and is skewed in relation to control surfaces 1006, 1008, 1010, and 1012.

Skew detection system 1000 includes sensor system 1014 and sensor system 1016. As can be seen in this illustrative example, these two sensor systems are connected in series using physical communications link 1018 and physical communications link 1020. Sensor system 1014 includes flexible line 1022 and sensor 1024. Sensor system 1016 includes flexible line 1026 and sensor 1028. In this example, sensor 1024 is a switch, and sensor 1028 is a breakaway connector.

In this example, control surface 1004 in plurality of control surfaces 1002 is skewed relative to axis 1030. Sensor system 1014 detects the skew and generates a signal indicating skew is present.

In FIG. 11, control surface 1012 fails at the left outboard side and is skewed relative to control surfaces 1006, 1008, 1004, and 1010. This skew is detected by sensor system 1016 in this example. In FIG. 12, control surface 1012 fails at the right inboard side and is skewed relative to control surfaces 1006, 1008, 1004, and 1010. This skew is detected by sensor system 1016.

Turning now to FIG. 13, a flowchart of a process for detecting skew is depicted in accordance with an advantageous embodiment. The process illustrated in FIG. 13 may be implemented in a skew detection system, such as skew detection system 300 in FIG. 3.

The process may begin by monitoring for a signal from a skew detection system (operation 1300). This skew detection system is an example of a skew detection system, such as skew detection system 300 in FIG. 3. In response to detecting the signal, an action is performed (operation 1302), with the process terminating thereafter. This action may include, for example, without limitation, generating an error message, halting operation of the plurality of control surfaces, generating an alert, and/or other suitable actions.

Thus, the different advantageous embodiments provide a method and apparatus for detecting skew. In one or more advantageous embodiments, the apparatus comprises a sensor system, a flexible line, and a sensor. This sensor system is capable of detecting skew in at least some of a plurality of control surfaces for a vehicle. The flexible line extends across a number of interfaces for a portion of the plurality of control surfaces. The sensor is connected to the flexible line and is capable of detecting the skew in the portion of the plurality of control surfaces in response to a selected amount of movement of the flexible line.

With one or more of the different advantageous embodiments, less complicated sensors, less wiring, less sensor demodulation circuitry, and/or lower costs may be achieved. The different advantageous embodiments may be used to augment currently existing skew detection systems that may not provide the different levels of skew detection that may be desired. Further, the different advantageous embodiments may be used to lower the weight and complexity of skew detection systems.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of platforms.

For example, although the different illustrative examples are described with respect to control surfaces in the form of slats on the wing of an aircraft, the advantageous embodiments may be applied to other types of control surfaces. For example, one or more of the different advantageous embodiments may be applied to flaps on the wing of an aircraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a sensor system capable of detecting a skew between a first control surface and a second control surface for a vehicle;
   a first flexible line extending across an interface between the first control surface and the second control surface;
   a first sensor in the second control surface connected to the first flexible line and configured to detect a first level of the skew between the first control surface and the second control surface in response to a first selected amount of movement of the first flexible line;
   a second flexible line extending across the interface; and
   a second sensor in the second control surface connected to the second flexible line and configured to detect a second level of the skew in response to a second selected amount of movement of the second flexible line;
   wherein the first sensor is in series with the second sensor.

2. The apparatus of claim 1, wherein the second flexible line is shorter in length than the first flexible line.

3. The apparatus of claim 1 further comprising:
   a plurality of guides attached to a plurality of control surfaces, wherein the first flexible line extends through the plurality of guides.

4. The apparatus of claim 3, wherein the plurality of control surfaces includes first control surface and the second control surface.

5. The apparatus of claim 1, wherein the first sensor generates a first signal in response to detecting the skew and the second sensor generates a second signal in response to detecting the skew.

6. The apparatus of claim 5, wherein the first sensor is a switch, and wherein the first signal is an open circuit condition.

7. The apparatus of claim 6 further comprising:
   a computer, wherein the computer receives the first signal.

8. The apparatus of claim 7 further comprising:
   an actuator system capable of moving the plurality of control surfaces, wherein the actuator system is controlled by the computer.

9. The apparatus of claim 1, wherein the first flexible line and the second flexible line are selected from one of a lanyard, a cable, a rope, and a wire.

10. The apparatus of claim 1, wherein the second sensor is selected from one of a switch, a contact switch, a position sensor, a breakaway connector, and a Hall effect switch.

11. The apparatus of claim 1, wherein the first control surface and the second control surface are slats and a or flaps.

12. The apparatus of claim 1, wherein the vehicle is an aircraft.

13. A skew detection system for an aircraft, the skew detection system comprising:
   a first sensor system comprising a first flexible line and a first sensor, wherein the first flexible line extends through a number of interfaces between a plurality of control surfaces, and wherein the first sensor is located in a particular control surface and is configured to generate a first signal in response to a first movement of the first flexible line by a first selected amount; and a second sensor system comprising a second flexible line and a second sensor, wherein the second flexible line extends through one of the number of interfaces between two of the plurality of control surfaces, wherein the second sensor located in the particular control surface and is configured to generate a second signal in response to a second movement of the second flexible line by a second selected amount, and wherein the first flexible line is longer in length than the second flexible line, the first sensor system detects a different level of skew than the second sensor system, and the first sensor system is connected in series with the second sensor system.

14. The skew detection system of claim 13, wherein the plurality of control surfaces are slats or flaps.

15. A method for detecting a skew, the method comprising:
monitoring for a first signal and a second signal from a skew detection system for a vehicle;
receiving the first signal from a first sensor in a particular control surface in response to a first amount of movement in a first flexible line extending across a number of interfaces between a number of control surfaces and connected to the first sensor;
receiving the second signal from a second sensor in the particular control surface connected to a second flexible line extending across an interface between the particular control surface and an adjacent control surface, wherein the second signal is generated in response to a second amount of movement in the second flexible line; and
responsive to detecting the first signal and the second signal, performing an action.

16. The method of claim 15, wherein the action is selected from at least one of generating an error message, halting operation of the plurality of control surfaces, and generating an alert.

17. The method of claim 15, wherein the first sensor detects a first level of the skew and the second sensor detects a second level of the skew.

* * * * *